United States Patent
Berthe et al.

(10) Patent No.: US 8,965,055 B2
(45) Date of Patent: Feb. 24, 2015

(54) SYSTEM FOR THE CALIBRATION OF OPERATING PARAMETERS OF A LASER ENGRAVER

(75) Inventors: Benoit Berthe, Orleans (FR); Ulrich Bielesch, Frucht (DE)

(73) Assignee: Entrust Datacard Corporation, Minnetonka, MN (US)

( * ) Notice: Subject to any disclaimer, the term of this patent is extended or adjusted under 35 U.S.C. 154(b) by 493 days.

(21) Appl. No.: 13/375,016

(22) PCT Filed: May 31, 2010

(86) PCT No.: PCT/EP2010/057525
§ 371 (c)(1),
(2), (4) Date: Nov. 29, 2011

(87) PCT Pub. No.: WO2010/136600
PCT Pub. Date: Dec. 2, 2010

(65) Prior Publication Data
US 2012/0074107 A1   Mar. 29, 2012

(30) Foreign Application Priority Data

May 29, 2009 (DE) .......................... 10 2009 023 288
May 29, 2009 (EP) ..................................... 09290403
May 29, 2009 (FR) ..................................... 09 02609

(51) Int. Cl.
*G01J 1/02*   (2006.01)
*G01J 3/02*   (2006.01)
(Continued)

(52) U.S. Cl.
CPC ................. *B23K 26/032* (2013.01); *G01J 1/02* (2013.01); *G01J 3/02* (2013.01); *G01J 3/28* (2013.01); *B23K 26/422* (2013.01)
USPC ........................................... 382/106; 73/1.79

(58) Field of Classification Search
CPC .................. G05D 25/00; G05D 25/02; B23K 26/36–26/4095; G01J 1/42; G01J 1/02; G01J 3/02; G01J 3/28

USPC ................. 382/106, 141, 152, 155, 165, 276; 73/1.79

See application file for complete search history.

(56) References Cited

U.S. PATENT DOCUMENTS 5,261,822 A    11/1993  Hall et al.
6,932,806 B2*  8/2005   Nakamura ........................ 606/5
(Continued)

FOREIGN PATENT DOCUMENTS

EP    0975148    1/2000
EP    1034756    9/2000

OTHER PUBLICATIONS

International Search Report for International Application No. PCT/EP2010/057525, dated Sep. 16, 2010 (4 pages).
(Continued)

*Primary Examiner* — Samuel M Heinrich
(74) *Attorney, Agent, or Firm* — Hamre, Schumann, Mueller & Larson, P.C.

(57) ABSTRACT

The present invention concerns a system for the calibration of at least one parameter of a laser engraver, the laser engraver comprising on one hand an engraving system with a focusing lens positioned at a distance of the surface of an substrate intended to be engraved and on the other hand a vision system for at least the positioning and the verification of the engraving, the vision system including a camera associated with an appropriate illumination and, wherein the engraving device of the laser is arranged in such way that the engraving device works to engrave a substrate with specific engraved layout corresponding to variation of at least one parameter and wherein the vision system is connected to a comparison device of at least one measured engraved parameter with the template value of at least one stored data in a memorization device connected to a engraving correction device.

24 Claims, 4 Drawing Sheets

(51) Int. Cl.
 *G01J 3/28* (2006.01)
 *B23K 26/03* (2006.01)
 *B23K 26/30* (2014.01)

(56) References Cited

U.S. PATENT DOCUMENTS

2002/0039706 A1 4/2002 Kamimura et al.
2002/0120198 A1 8/2002 Nakamura
2004/0031779 A1* 2/2004 Cahill et al. ............ 219/121.83

OTHER PUBLICATIONS

Written Opinion for International Application No. PCT/EP2010/057525, dated Sep. 16, 2010 (8 pages).
European Search Report of European Patent Application No. 09290403.6, dated Nov. 3, 2009 (6 pages).

* cited by examiner

SYSTEM FOR THE CALIBRATION OF OPERATING PARAMETERS OF A LASER ENGRAVER

The invention relates to the domain of devices and methods for the automation of the adjustment of operating parameters for laser engravers and more particularly for the calibration of colour levels, size and marking distance of laser engravers.

Laser engraving refers to the practice of using lasers to engrave or mark an object. The technique can be very technical and complex, and often a computer system is used to control the engraving by a laser head. Despite this complexity, very precise and clean engravings can be achieved at a high rate. The technique does not involve tool bits which contact the engraving surface and wear out. This is considered an advantage over alternative engraving technologies where bit heads have to be replaced regularly. The impact of laser engraving has been more pronounced for specially-designed "laserable" materials. These include polymer and novel metal alloys. At least one property of these "laserable" materials is to have a change of colour according to the amount of energy provided by the laser beam during the engraving operations. In situations where physical alteration of a surface by engraving is undesirable, an alternative such as "marking" is available.

Thus, one use of laser engravers is for the marking of applications such as plastic cards. The marking of these applications by laser can result in variable grey levels. This different grey levels variation may be obtained by a variation in point density. Another method of creating different grey levels on the marking area may be by changing the power level of the laser. However, other parameters influence the creation of these grey levels such as the material characteristics of the workpiece or the marking distance which may directly affect the size of the laser generated spots of the engraved structure. Consequently, the adjustment of the laser engraver should be done mainly according to grey levels, size and marking distance measured by the vision system of the laser engraver. This vision system participates for at least the positioning and the verification of the engraved application.

Up until now, the adjustment of the laser engraver and the calibration of the vision system are done independently from each other and manually by successively running test cards. The results are measured and analysed in relation with the values to be adjusted. These measurements lead to new parameters for the laser engraver respectively the vision system, which have to be validated by running and measuring additional test cards as described above. This procedure has to be repeated until a sufficient result has been achieved. However, this calibrating method takes time and effort when the adjustments of several laser engravers have to be done to get an identical result for each of them.

A first object of the present invention is to propose a system arranged to provide a time reduced calibration and effortless adjustment of a laser engraver with a better precision, this system being arranged to adjust identically the alignment of a plurality of laser engravers and further avoiding at least one defect or one disadvantage of the prior art of the invention.

This object is achieved by a system for the calibration of at least one parameter of a laser engraver, the laser engraver comprising on one hand an engraving system with a focusing lens positioned at a distance of the surface of an substrate intended to be engraved, the laserable substrate being made of at least one changing color component according to the energy provided by the laser engraver, and on the other hand a vision system for at least the positioning and the verification of the engraving, the vision system including a camera associated with an appropriate illumination and, wherein the engraving device of the laser is arranged in such way that the engraving device works to engrave a substrate with specific engraved layout corresponding to variation of at least one parameter and wherein the vision system is connected to a comparison device of at least one measured engraved parameter with the template value of at least one stored data in a memorisation device connected to a engraving correction device.

According to a variant of the invention, the system for the calibration of at least one parameter of a laser engraver is characterised in that the data stored in the memorisation device correspond to the values of at least one parameter memorised from an engraved calibration card used as a reference element and positioned at the place of the engraved substrate.

According to a realisation of this variant of the invention, the system for the calibration of at least one parameter of a laser engraver is characterised in that the calibration card provide a square pattern, each square of the pattern having a defined position and presenting a variation of at least one parameter different of at least one other square of the pattern.

According to an additional variant of the invention, the system for the calibration of at least one parameter of a laser engraver is characterised in that the parameter of the laser engraver is at least a grey level corresponding to the energy provided by the laser or a size of the engraving surface determine by the distance between laser head and the engraved substrate.

According to another variant of the invention, the system for the calibration of at least one parameter of a laser engraver is characterised in that the calibration of the marking distance is carried out by a working position test card comprising several grey patterns, each pattern having the same grey colour and the same value of dots-per-inch (dpi) but presenting an engraving at different marking distances between the focusing lens of the laser of the engraving system and the engraved substrate.

According to a first realisation of this variant of the invention, the system for the calibration of at least one parameter of a laser engraver is characterised in that the focal distance of the focusing lens is defined as the reference for the alignment of the engraving working position.

According to a second realisation of this variant of the invention, the system for the calibration of at least one parameter of a laser engraver is characterised in that a distance of the focusing lens relating to a local maximum of the darkness of a grey pattern element, when the marking distance is modified, is defined as the reference for the alignment of the engraving working position.

According to another variant of the invention, the system for the calibration of at least one parameter of a laser engraver is characterised in that the system comprises a device for positioning the engraved substrate in respect of an angle of the substrate during the engraving, to modify the influence of the illumination during exposure of the vision system onto the engraved substrate by providing a measurement of at least one parameter by the vision system according to a new angle.

According to a realisation of this variant of the invention, the system for the calibration of at least one parameter of a laser engraver is characterised in that the reference value of the stored data in the memorisation device connected to the vision system correction device are associated with an angle value corresponding to the angle of the position of the engraved substrate during the measurement operation.

A second object of the present invention is to provide a method for implementing at least one of the variant of the system of the invention.

This object is achieved by a method for the calibration of at least one parameter of a laser engraver using a system according to at least one of the variant of the system of the invention, wherein the method comprises at least:

a step of engraving a substrate with specific engraved layout corresponding to variation of at least one parameter by the engraving device of the system, a step of measuring the value of the parameter of at least one pattern by the vision system according to a position angle of the substrate taken as a reference, a step of comparing at least one measured value with at least one template value stored in a memorisation device of the associated vision system, a step of adjusting at least the parameter of the engraving device according to the comparison result by the engraving correction device, a step of engraving a new substrate according to newly adjusted parameter, each time the measured value does not match with the template value stored in the memorisation device.

According to a variant of the invention, the method for the calibration of at least one parameter of a laser engraver is characterised in that the method comprises at least:

a step of measuring and comparing the size of the pattern on the engraved substrate, or a step of measuring and comparing the grey level of the pattern on the engraved substrate.

According to a variant of the invention, the method for the calibration of at least one parameter of a laser engraver using a variant of the system of the invention, is characterised in that the method comprises at least:

a step of checking whether all viewing angles are monitored, a step of modification of the position of the engraved substrate in respect of the angle of engraving, to modify the viewing angle of the vision system and the influence of the illumination onto the engraved substrate a step of measuring at least one parameter by the vision system according to a new angle.

According to a variant of the invention, the method for the calibration of at least one parameter of a laser engraver using a variant of the system of the invention, is characterised in that the method previously comprises at least:

a step of engraving a working position test card comprising a pattern with at least one parameter needed for the alignment of the engraving system, a step of measuring and storing the value of the parameter of at least one pattern of the test card, a step of defining one stored parameter as the working position.

According to a particularity of this variant of the invention, the method for the calibration of at least one parameter of a laser engraver using a variant of the system of the invention, is characterised in that the method previously comprises at least:

a step of engraving a working position test card comprising a pattern with several grey elements, each element of the pattern having the same grey level and the same value of dots-per-inch (dpi) but presenting an engraving at different marking distances between the focusing lens of an engraving system and engraved substrate to the vision system, a step of measuring the grey level of each engraved element of the test card, a step of storing the marking distance of the element presenting the most interesting grey level, a step of defining the stored marking distance as the working position.

According to a particularity of this variant of the invention, the method for the calibration of at least one parameter of a laser engraver using a variant of the system of the invention, is characterised in that, after the step of engraving a working position test card, the method comprises at least:

a step of controlling that all elements are engraved, a step of increasing the distance between the focussing lens of the laser engraving system and the material in front of this lens according to programmed increment whether at least one element is missing, a step of renewing the engraving step.

Further, according to a first particularity of this variant of the invention, the method for the calibration of at least one parameter of a laser engraver using a variant of the system of the invention, is characterised in that the engraving working position is aligned to the marking distance of the element presenting the darkest grey level.

According to a second particularity of this variant of the invention, the method for the calibration of at least one parameter of a laser engraver using a variant of the system of the invention, is characterised in that the engraving working position is aligned to the focal distance of the focusing lens.

According to a third particularity of this variant of the invention, the method for the calibration of at least one parameter of a laser engraver using a variant of the system of the invention, is characterised in that the engraving working position is aligned to a distance of the focusing lens reaching a local maximum of the darkness, when the marking distance is modified.

According to a variant of the invention, the method for the calibration of at least one parameter of a laser engraver using a variant of the system of the invention, is characterised in that the method previously comprises at least:

a step of storage of data in the memorisation device by positioning at the place of the engraved substrate an engraved calibration card used as a reference element with template values pattern for at least one parameter A further aspect of the invention provides a method for calibration at least one parameter of a laser engraver, the method comprising, positioning at the place of a workpiece or object to be engraved a workpiece or object with a calibrated pattern used as a reference, whereas the appropriate values of the pattern are captured by a vision system and stored in a memory as reference values, so that the comparable pattern of a following workpiece or object engraved by the laser engraver, to be calibrated, is captured by the same vision system and the comparison of the values of the pattern from the actual engraved workpiece or object with the reference values stored in the memory is used to calibrate at least one appropriate parameter of the laser engraver.

In some embodiments of the invention the method may further include making the reference pattern out of different grey pattern, whereas the grey values are captured by the vision system and stored as reference values in order to be compared with the grey values generated on a workpiece or object by the laser engraver and captured by the same vision system for calibrating the laser power of the laser engraver according to the values of the reference pattern.

In an embodiment of the invention a reference pattern prescribing sizes within the engraved area, which are captured by the vision system and the sizes are stored as reference values in order to be compared with the sizes of the pattern generated on a workpiece or object by the laser engraver and captured by the same vision system for calibrating the beam deviation system of the laser engraver according to the sizes of the reference pattern.

The method may further include prior to a calibration according to any one of claims 20 to 22, a step of defining the working distance between the laser engraver and the workpiece by engraving a pattern of grey areas having the same input values with the same laser parameters using different distances between the laser engraver and the workpiece for each grey area, so that the resulting engraved grey values are different because of the distance between the laser engraver and the workpiece, which are used to define a working distance corresponding to a defined grey value.

In some embodiments of the invention the method may further include using material for the reference workpiece and the workpiece dedicated to be laser engraved for the purpose of calibration, which have the same material characteristics concerning laser engraving.

The method in some embodiments may include using multiple, different settings of the vision system to capture the calibrated pattern of the reference, whereas the same multiple settings of the vision system are used to capture the values of the pattern of the workpiece, which is laser engraved for the purpose of calibration of the laser engraver.

The method in some embodiments may include using multiple, different angles between calibrated pattern of the reference and the vision system and/or the illumination system to capture the values from the reference pattern, whereas the same multiple angles are used to capture the values of the pattern of the workpiece, which is laser engraved for the purpose of calibration of the laser engraver The invention, with its characteristics and features, will appear clearer and be illustrated with more details in the following description with reference to the attached figures in which:

It will be readily understood that the components of the present invention, as generally described and illustrated in the several of the above references figures, may be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of selected embodiments of the invention.

Many of the functional units described in this specification have been labelled as devices, in order to more particularly emphasize their implementation independence. For example, a device may be implemented as a hardware circuit comprising custom VLSI circuits or gate arrays, off-the-shelf semiconductors such as logic chips, transistors, or other discrete components. A device may also be implemented in programmable hardware means such as field programmable gate arrays, programmable array logic, programmable logic means or the like.

Devices may also be implemented in software for execution by various types of processors. An identified device of executable code may, for instance, comprise one or more physical or logical blocks of computer instructions which may, for instance, be organized as an object, procedure, or function. Nevertheless, the executables of an identified device need not be physically located together, but may comprise disparate instructions stored in different locations which, when joined logically together, comprise the device and achieve the stated purpose for the device.

Indeed, a device of executable code could be a single instruction, or many instructions, and may even be distributed over several different code segments, among different programs, and across several memory means. Similarly, operational data may be identified and illustrated herein within devices, and may be embodied in any suitable form and organized within any suitable type of data structure. The operational data may be collected as a single data set, or may be distributed over different locations including over different storage means, and may exist, at least partially, merely as electronic signals on a system or network.

Reference throughout this specification to "one arrangement" or "an arrangement" means that a particular feature, structure, or characteristic described in connection with the arrangement is included in at least one arrangement of the present invention. Thus, appearances of the phrases "in one arrangement" or "in an arrangement" in various places throughout this specification are not necessarily all referring to the same arrangement.

Furthermore, the described features, structures, or characteristics may be combined in any suitable manner in one or more arrangements. In the following description, numerous specific details are provided, such as examples of programming, software devices, user selections, network transactions, database queries, database structures, hardware devices, hardware circuits, hardware chips, etc., to provide a thorough understanding of arrangements of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The present invention concerns the adjustment of grey levels, size and marking distance in a laser engraver (1) by varying the energy of the laser beam and the distance between the laser head and the substrate to be engraved with defined grey levels. The substrate used to be engraved by the laser engraving system of the invention has specific properties. In particular, this substrate is made of "laserable" material which is able to change its color according to the amount of energy provided by the laser beam during the engraving operations. Thus, the adjustment of grey level is obtained for controlling energy by varying the working distance separating the laser engraving head and the "laserable" substrate as detailed on the diagram shown by FIG. 8, or by varying the power settings when the working distance is kept aligned. The modification of the distance the laser head and the substrate is also a possibility to change the size of the grey spot or of the grey surface obtained onto the substrate.

Figure 1:
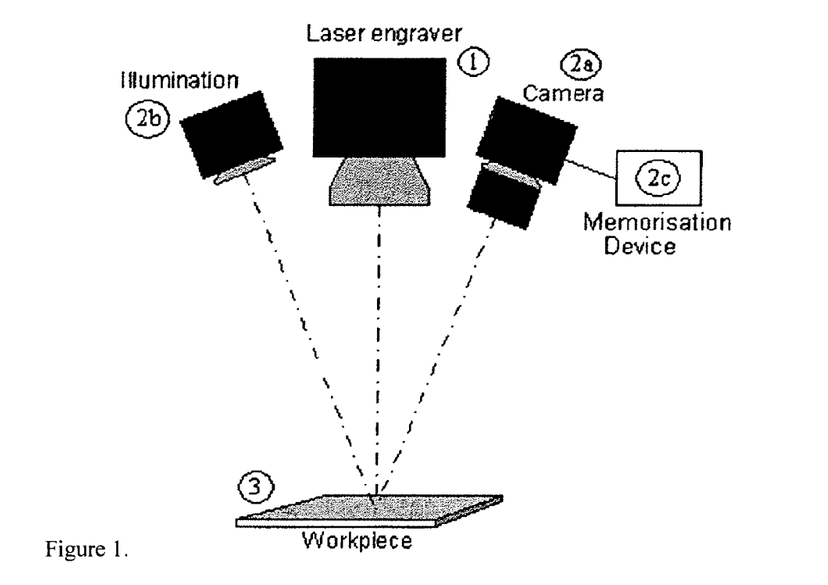
FIG. 1 is a diagram of a laser engraver with vision system showing an engraving position and a first position of the substrate with the vision system corresponding to the default position of the vision system.

The invention comprises an arrangement able to modify the energy of the laser beam or to vary the focus and the distance between laser head of the engraving laser and the surface of the substrate as shown with FIG. 1. Thus, the variation of energy of the laser or of distance is obtained by result of steps of the method implemented by such arrangement.

The laser engraver (1) usually comprises a vision system (2) which implements the positioning of the substrate (3) before the engraving process and the verification of the engraved substrate (3). This vision system (2) comprises at least a camera (2*a*) associated with an illumination device (2*b*) to provide an optimized view and lighting of the substrate (3) when measured. The vision system is connected to a memorisation device (2*c*) into which a database is stored. This database comprises values of at least one parameter used as references for the calibration of the laser engraver (1).

The storage of these reference values is carried out with a calibration card (4). This calibration card (4) is arranged to be positioned at the place of the engraved substrate (3) when the verification process is operating, in front and at a defined distance of the object lens of the vision system (2). The calibration card (4) is an engraved card that may be provided by a correctly calibrated laser engraver depending on the kind of parameter that is to be calibrated. Indeed, the alignment of working distance can be carried out without using a calibration card from an already aligned system, as the required position is determined by relative measurement within the engraved calibration card having a pattern as shown on FIG. 4. The working position is marked by a characteristic grey pattern with respect to the other grey level patterns of the same card. However the alignment of grey level or the alignment of size should use a calibration card from an already aligned system. The vision system of the engraver in process records the data from this calibration card from the already aligned system and compares these values to the result of the engraver in process. This calibration card leads to the same results according to grey levels and size whereas the working distance of different engraver may be different.

Figure 3:
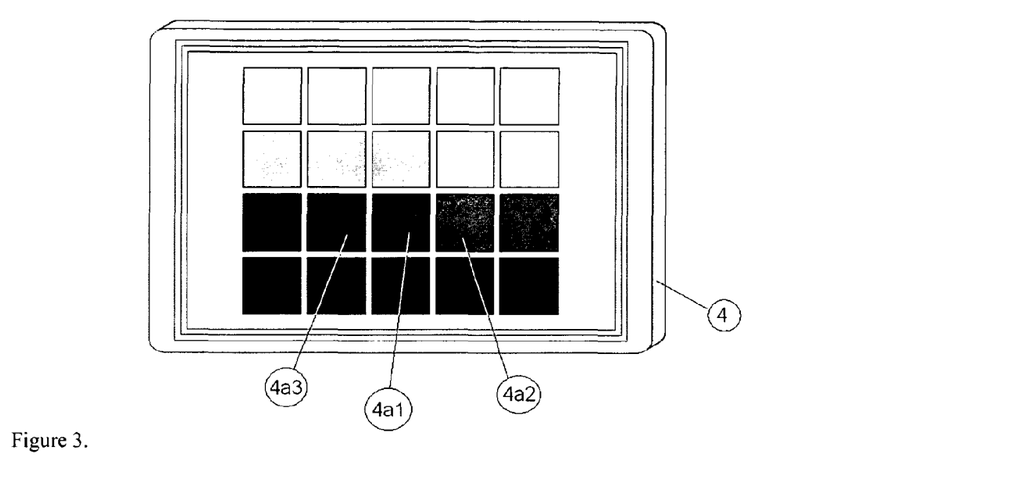
FIG. 3 is a diagram of an example of calibration card for the adjustment of grey levels and size.
Figure 4:
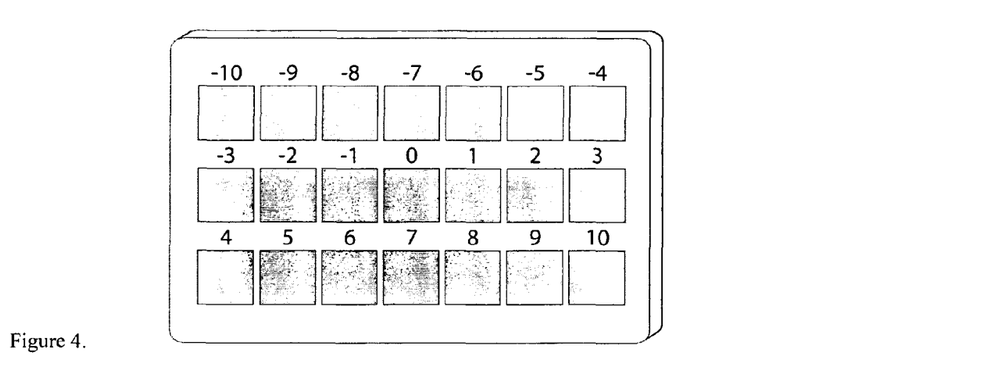
FIG. 4 is a diagram of an example of engraving layout for the adjustment of the working position.
Figure 5:
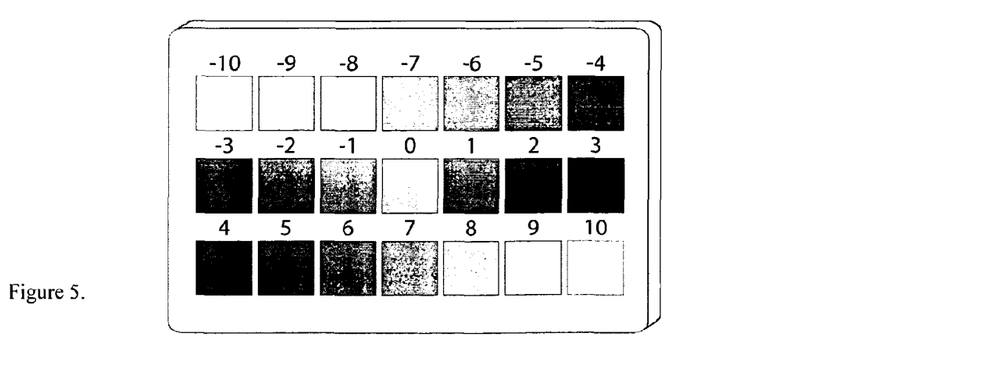
FIG. 5 is a diagram of an example of an engraving result for the alignment of the working position after the engraving step.

The calibration card (4) comprises a pattern formed by a plurality of template arranged according to a layout like, for example, a square pattern. Each square (4*a*) of the pattern is defined by its position, referenced, for example, with a position number. Each element (4*a*1) of the pattern presents a variation of at least one parameter different of at least one other element (4*a*2) of the pattern. The variable parameter can be the grey level due to the level of energy delivered by the laser beam or the size of each engraved pattern (4*a*) depending on the focus distance separating the laser engraving head and the "laserable" substrate. This modification of the distance provides a possibility to change the size of the grey spot or of the grey surface obtained onto the substrate.

According to a particular arrangement of the calibration card (4), the card provide a square pattern wherein each square of the pattern provides an element which has a defined position that may be referenced, for example, by a position number.

When the calibration card (4) is disposed in front of the object lens of the vision system (2), the values of at least one parameter of the calibration card (4) are read and measured by the vision system and stored in the memorisation device (2*c*) to fill or complete the database of the memorisation device (2*c*).

Once at least one parameter is stored in the memorisation device (2*c*), the adjustment of the laser engraver can be operated. The steps of the adjustment of this engraving are shown on FIG. 6. First, an engraving of a substrate is operated according to a particular programmed layout which is preferentially identical to the layout of the pattern of the calibration card (4). Next, the result of this engraving, what means this engraved substrate (3), is positioned in front of the object lens of the vision system (2), where its engraved surface is monitored, read and measured, in order to compare at least one parameter of the engraving with the stored data in the memorisation device (2*c*). The value of each element of the pattern, defined by its position, is compared with the value corresponding in the stored data to the same defined position.

Figure 6:
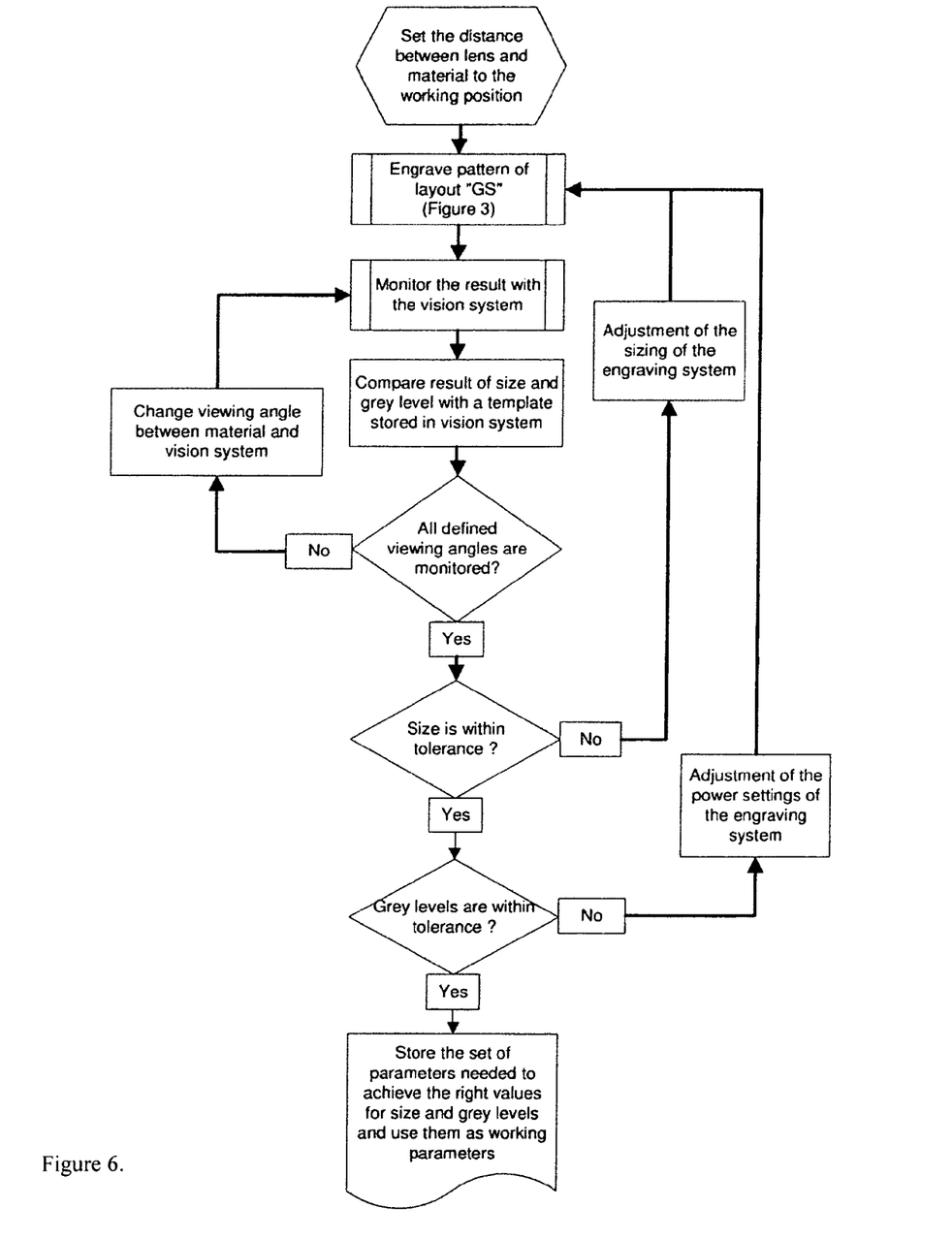
FIG. 6 is a flowchart of the method of the invention for the automated alignment at different angle and the adjustment of the several parameter.

After the comparison, if the comparison does not result into a correct matching of the measured parameter with the values of the template stored in the memorisation device (2*c*), the engraving system (1) is adjusted for the compared parameter. Thus, the size and the grey level of the pattern of the engraved substrate (3) are successively monitored and compared with the stored data in order to adjust this parameter or these parameters of the engraving system (1).

According to a particularity of the invention, the adjustment of the engraving system (1) is operated only when the result of this comparison is not within a range of tolerance.

When the adjustment of the parameter is operated for the engraving system (1), a new substrate is engraved by the laser. This new engraved substrate is then monitored according to the same way as for the first engraved substrate. These operations are repeated until the parameters for the engraving of the substrate are operated to match with the data stored in the memorisation device (2*c*) for this operation. Once the adjusted parameter correctly matches with the stored data, the adjustment of the parameter to the right values for the engraving system (1) is stored and used as working parameter.

Figure 2:
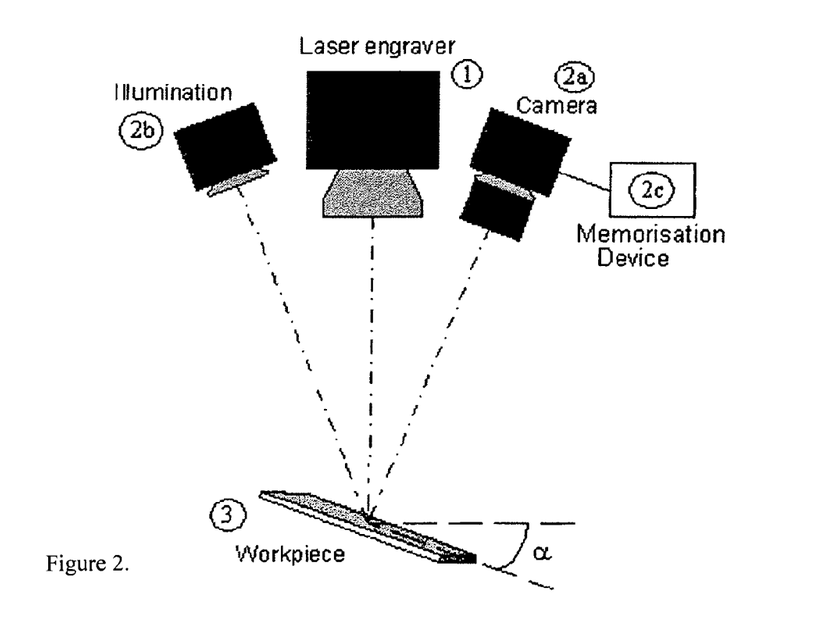
FIG. 2 is a diagram of a laser engraver with vision system showing a second position of the substrate with the vision system corresponding to a position of the work-piece according to an angle with the position of the substrate during the exposure to the vision system for an additional view by the camera of the system.

According to a particularity of the invention, the system for the calibration of the laser engraver comprises a device for modifying the positioning of the engraved substrate (3) in respect of at least one particular angle ($\alpha$) of engraving during the exposure of the vision system. This particular positioning provides a modification of the illumination onto the engraved substrate (3) and consequently, modifies the monitoring of this engraved substrate (3). This modification in the monitoring of the engraved substrate (3) by the vision system provide a different set of measures for a same parameter and, thus, can avoid the influence of distortions caused by reflections due to the illumination onto the surface. However, as the values of the parameter are depending from the inclination and from the angle ($\alpha$), the values stored in the memorisation device are registered according to a specific angle. Thus the comparison step is operated between the measured values and the corresponding values for the same angle ($\alpha$) of inclination stored in the memorisation device (2*c*).

During the adjustment of the engraving system (1) parameters, the adjustment to the right values can be operated with precision according to the stored data function of the different values for the viewing angle. Consequently, the accuracy of the adjustment is enhanced. When a comparison step is carried out for a first value of angle, the system checks if another set of data for the adjusted parameter is stored in the memorisation device (2*c*). If not all stored viewing angles have been monitored, the viewing angle is changed between the vision system and the engraved substrate. Thus, the plurality of monitoring of a same parameter onto a same engraved substrate (3) according to several viewing angles (α) optimises the accuracy of the adjustment with a limited number of engraved substrate (3) after successive adjustments of the engraving system (1).

Previously to the calibration of the adjustment of a parameter such as the grey level or the size of the engraving, an alignment of the working distance of the laser engraver is preferentially operated. The steps for the alignment of the working distance are shown on the flow chart of FIG. 7. A first distance between the focussing lens of the laser engraving system and the substrate in front of this lens is used as a starting distance. A first substrate is marked by the laser engraving system according to a particular layout to provide a test card with the same grey level, the same size and the same dots-per-inch (dpi) value for each element (4a1) of the engraved pattern shown on FIG. 4. However, the engraving of each element of the test card has been operated with a different marking distance so that the resulting pattern appears with different grey levels (shown in FIG. 5) to the vision system due to the working position of the engraving system. Indeed, according to the variation of the grey level as a function of the marking distance, as shown on FIG. 8. When the laser engraving is operated with the same energy level and a short marking distance, the grey value increases by lengthen the marking distance until a local maximal value of darkness, referenced on FIG. 8 as point A. Further extending of the distance will result in decreasing darkness to a local minimal value, marked point C on FIG. 8 and corresponding to the focal distance F of the focusing lens, of the engraving system. Further increasing of the length of the marking distance results in a second local maximal value for the darkness, referenced as point B on FIG. 8.

Figure 7:
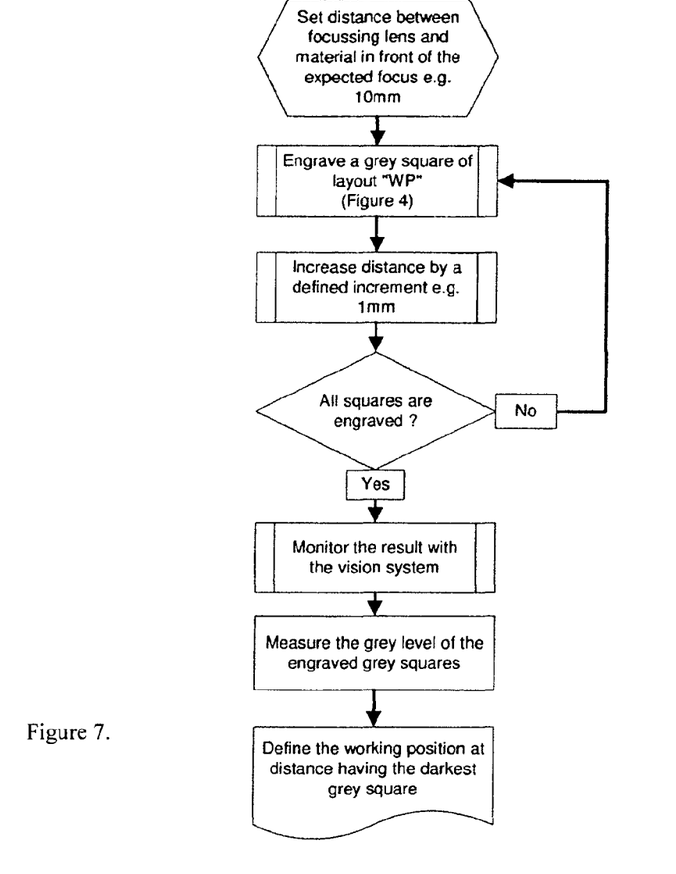
FIG. 7 is a flowchart of the method of the invention for the automated focus alignment.
Figure 8:
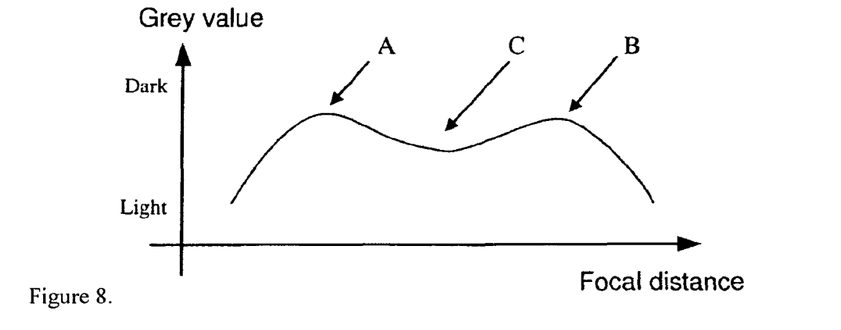
FIG. 8 is a diagram illustrating the grey level value depending on the marking distance of the engraving.

Once the engraving of the test card is operated, a device controls whether that all squares or elements of the pattern are engraved. If at least one of them is missing, the distance between the focussing lens of the laser engraving system and the material in front of this lens is changed according to programmed increment. This increment can be a fixed distance or proportional to the missing part of the pattern. When all the elements of the pattern are engraved, the result of the engraving steps is monitored by the vision system to measure the grey level of each engraved element of the test card and the marking distance of the element presenting the appropriate grey level is stored to be defined as the working position.

According to a particularity of the process for the alignment of the engraving system, the step of monitoring the engraved test card can be operated according to several viewing angles (a), as previously explained.

At least one advantage of the system of the invention is that because of the storing of calibration data in the memorisation device of the vision system (2), the alignment and the adjustment of parameters of the engraving system can be re-operated in adequate periods in time.

It will be obvious for those skilled in the art that the present invention allows embodiments under many other specific forms without departing from the field of application of the invention as claimed. Therefore, the present embodiments have to be considered as an illustration but may be changed in the field defined by the scope of the appended claims.

The invention claimed is:

1. A system for the calibration of at least one operating parameter of a laser marker, comprising:
    a marking system with a focusing lens positioned at a distance from a surface of a plastic card to be marked, the plastic card including a component which color changes according to an energy provided by the laser marker;
    a vision system;
    a comparison device connected to the vision system;
    a marking correction device; and
    a memorization device connected to the marking correction device,
    wherein the marking system is arranged to mark a test card with a specific layout corresponding to a variation of at least one operating parameter of the laser marker;
    wherein the comparison device is arranged to carry out a comparison of at least one parameter measured by the vision system on the marked test card with a reference value stored in the memorization device; and
    wherein the marking correction device is arranged to carry out the calibration of the at least one operating parameter of the laser marker on the basis of said comparison.

2. The system for the calibration of at least one operating parameter of a laser marker according to claim 1, wherein the reference value stored in the memorization device corresponds to the value of at least one parameter obtained by the vision system from a test card, the test card being positioned at the place of the plastic card to be marked.

3. The system for the calibration of at least one operating parameter of a laser marker according to claim 2, wherein the test card comprises a pattern of squares, each square of said pattern having a defined position and at least one parameter of each square being different from a parameter of at least one square of said pattern other than said each square.

4. The system for the calibration of at least one operating parameter of a laser marker according to claim 1, wherein the at least one operating parameter of the laser marker is one of an energy provided by the laser, corresponding to a grey level, and a marking distance between the focusing lens and the surface of the plastic card to be marked, which marking distance determines a size of a marking surface on the plastic card to be marked.

5. The system for the calibration of at least one operating parameter of a laser marker according to claim 4, wherein the at least one operating parameter is the marking distance and wherein the calibration of said at least one operating parameter is carried out by using a test card comprising several grey patterns, each of said grey patterns having a same grey color and a same number of dots per inch but having been marked at a marking distance between the focusing lens and the surface of the test card different from the marking distance used for marking grey patterns other than said each of said grey patterns.

6. The system for the calibration of at least one operating parameter of a laser marker according to claim 5, wherein the focal distance of the focusing lens is used as a reference for the alignment of the marking distance.

7. The system for the calibration of at least one operating parameter of a laser marker according to claim 5, wherein a distance between the focusing lens and the surface of the test card which yields a darkest grey pattern is defined as a reference for the alignment of the marking distance.

8. The system for the calibration of at least one operating parameter of a laser marker according to claim 1, further comprising an illumination device and a positioning device for adjusting an angle of the test card with respect to the illumination device, thereby modifying the influence of an illumination of the test card on measurements of the vision system on the test card.

9. The system for the calibration of at least one operating parameter of a laser marker according to claim 8, wherein the memorization device is arranged to store, in association with the reference value, a corresponding value of said angle of the test card with respect to the illumination device.

10. A method for the calibration of at least one operating parameter of a laser marker, wherein the method comprises:

a) marking, by a marking system of the laser marker, a test card with a specific layout corresponding to a variation of at least one operating parameter of the laser marker, thereby obtaining a marked test card;
b) measuring a parameter on the marked test card by a vision system of the laser marker according to an angle of the marked test card relative to an illumination device of the laser marker;
c) comparing, by a comparison device connected to the vision system, the parameter measured by the vision system with a reference value stored in a memorization device of the vision system;
d) calibrating an operating parameter of the laser marker according to the comparison result by a marking correction device, thereby obtaining a newly calibrated operating parameter;
e) testing whether the parameter measured by the vision system matches a reference value stored in the memorization device;
f) if the parameter measured by the vision system does not match a reference value stored in the memorization device, marking a new test card according to the newly calibrated operating parameter, thereby obtaining a new marked test card, and repeating steps b) to f) with the new marked test card as the marked test card.

11. The method for the calibration of at least one operating parameter of a laser marker according to claim 10, wherein the method further comprises at least one of:
measuring the size of a pattern marked on the marked test card and comparing it to a reference value; and
measuring the level of grey of a pattern marked on the marked test card and comparing the measured level to a reference value.

12. The method for the calibration of at least one operating parameter of a laser marker according to claim 10, wherein the method further comprises repeating:
modifying an angle of the marked test card relative to the illumination device thereby modifying the influence of the illumination device on measurements carried out on the marked test card;
measuring a parameter on the marked test card by the vision system according to the modified angle;
until a parameter on the test card has been measured for all angles of the marked test card relative to the illumination device.

13. The method for the calibration of at least one operating parameter of a laser marker according to claim 10, wherein the method further comprises:
marking a pattern on a test card according to an operating parameter of the laser marker;
measuring and storing a parameter of a pattern marked on the test card; and
using a stored parameter to determine an operating parameter of the laser marker.

14. The method for the calibration of at least one operating parameter of a laser marker according to claim 10, wherein the method further comprises:
marking a pattern on a test card, wherein the pattern comprises several grey elements, each grey element of the pattern having a same level of grey and a same number of dots per inch but having been marked at a marking distance between a focusing lens of the marking system and a surface of the test card different from the marking distance used for marking grey elements other than said each grey element of the pattern;
measuring the level of grey of each grey element marked on the test card;
storing the marking distance used for obtaining the element presenting the darkest level of grey; and
selecting the stored marking distance as an operating parameter of the laser marker.

15. The method for the calibration of at least one operating parameter of a laser marker according to claim 14, comprising, after having marked a pattern on the test card:
controlling whether all grey elements of the pattern have been marked;
if a grey element failed to be marked, setting the distance between the focusing lens of the marking system and the surface of the test card to a programmed value corresponding to the missing grey element and marking the missing grey element.

16. The method for the calibration of at least one operating parameter of a laser marker according to claim 14, wherein the marking distance between the focusing lens of the marking system and the surface of the test card is defined as a distance such that a grey element marked from such distance is darker than a grey element marked from any distance close to such distance.

17. The method for the calibration of at least one operating parameter of a laser marker according to claim 10, wherein the method further comprises:
obtaining a reference value by positioning at the place of a plastic card to be marked a marked test card used as a reference element and by measuring a parameter from the marked test card; and
storing the reference value in the memorization device.

18. A method for calibration of at least one operational parameter of a laser marker, comprising:
positioning at the place of a plastic card to be marked a test card with a calibrated pattern used as a reference;
measuring a parameter of the calibrated pattern by a vision system;
storing the measured parameter in a memory as a reference value;
measuring a parameter of a comparable pattern of an other test card marked by the laser marker to be calibrated by said vision system;
carrying out a comparison of the parameter measured from the other test card with the reference value stored in the memory; and
carrying out a calibration of an operational parameter of the laser marker by using the comparison.

19. The method for calibration of at least one operational parameter of a laser marker according to claim 18, wherein the calibrated pattern comprises different grey elements, the method further comprising:
measuring a parameter of a grey element of the calibrated pattern by the vision system;
storing the measured parameter as a reference value in a memory;
measuring a parameter of a grey element from another test card marked by the laser marker by the vision system and carrying out a comparison of said measured element with the reference value stored in the memory; and
calibrating a laser power of the laser marker according to the comparison.

20. The method for calibration of at least one operational parameter of a laser marker according to claim 18, wherein the calibrated pattern defines sizes of areas within the marked area of the test card, which sizes are measured by the vision system and stored as reference values in the memory, and the method further comprising:
carrying out a comparison of stored sizes with sizes from a calibrated pattern of another test card marked by the laser marker and measured by the vision system; and
calibrating a beam deviation system of the laser marker according to the comparison.

21. The method for calibration of at least one operational parameter of a laser marker according to claim 18, comprising, prior to the calibration, defining a marking distance between a focusing lens of the laser marker and a surface of a plastic card to be marked by:
- marking a pattern of grey areas on a test card, all grey areas being marked with identical operational parameters of the laser marker, except that each grey area is marked using a different marking distance between the focusing lens of the laser marker and a surface of the test card, each grey area thereby being different;
- measuring the grey areas with the vision system;
- selecting a grey area among the measured grey areas; and
- using a marking distance corresponding to the selected grey area.

22. The method for calibration of at least one operational parameter of a laser marker according to claim 18, further comprising:
- using a same plastic material for the plastic card to be marked and the test card dedicated to be laser marked for the purpose of calibration.

23. The method for calibration of at least one operational parameter of a laser marker according to claim 18, further comprising:
- using multiple, different settings of the vision system to measure the calibrated pattern used as a reference, the same multiple settings of the vision system being used to measure the pattern of the test card which is laser marked for the purpose of calibration of the laser marker.

24. The method for calibration of at least one operational parameter of a laser marker according to claim 18, further comprising:
- using different angles between a test card comprising a calibration pattern used as a reference and an illumination system when measuring the calibrated pattern with the vision system, and using the same different angles when measuring the patterns on further test cards for the calibration of the laser marker.

* * * * *